United States Patent [19]

Workman, Jr. et al.

[11] 4,215,594

[45] Aug. 5, 1980

[54] TORQUE RESPONSIVE SPEED SHIFT MECHANISM FOR POWER TOOL

[75] Inventors: William Workman, Jr., Spring Lake; John R. Bos, Grand Haven, both of Mich.

[73] Assignee: Cooper Industries, Inc., Houston, Tex.

[21] Appl. No.: 924,525

[22] Filed: Jul. 14, 1978

[51] Int. Cl.² .......... F16H 3/74

[52] U.S. Cl. .......... 74/751; 173/12

[58] Field of Search .......... 74/751, 752 E, 752 B; 173/12

[56] References Cited

U.S. PATENT DOCUMENTS

| | | | |
|---|---|---|---|
| 3,187,860 | 6/1965 | Simmons | 74/751 |
| 3,257,877 | 7/1966 | Ulrich | 74/751 |
| 3,430,521 | 3/1969 | Kulman | 74/750 |
| 3,610,343 | 10/1971 | Bratt | 173/12 |
| 3,739,659 | 6/1973 | Workman, Jr. | 74/751 |
| 3,845,673 | 11/1974 | Kårdén et al. | 74/751 |
| 3,960,035 | 6/1976 | Workman, Jr. et al. | 74/785 |

*Primary Examiner*—Richard E. Moore
*Attorney, Agent, or Firm*—Michael E. Martin

[57] ABSTRACT

A power tool speed shifting mechanism includes a planetary gear set wherein the ring gear is connected to the driven member of a torque responsive disengageable clutch. The driving clutch member is keyed for rotation with the sun gear of the planetary gear set; and the ring gear is mounted in a one-way clutch to provide for unidirectional rotation of the entire planetary gear set at the speed of the sun gear when the torque responsive clutch is engaged. The one-way clutch is mounted in an axially movable but substantially nonrotatable member of a torque responsive coupling. In response to a predetermined torque being transmitted through the speed shifting mechanism the clutch members disengage to impose a reaction torque on the coupling through the ring gear and the clutch. Axial movement of the one coupling member together with the ring gear holds the clutch disengaged whereby the planet gear carrier then rotates at a reduced speed with respect to the sun gear.

10 Claims, 6 Drawing Figures

TORQUE RESPONSIVE SPEED SHIFT MECHANISM FOR POWER TOOL

BACKGROUND OF THE INVENTION

This invention pertains to improvements in power tools for tightening threaded fasteners wherein mechanisms are provided for driving the output spindle of the tool at high speed during the relatively free running portion of the tool operating cycle before the fastener strongly resists rotation, and then driving the output spindle at a relatively low speed during the final tightening process in order to produce a desired final torque on the fastener. Such mechanisms are usually provided in fastener torquing tools instead of providing the tool with a relatively large motor the capacity of which is not needed during the free running portion of the tool operating cycle. Known devices in the field of the present invention include apparatus such as that disclosed in U.S. Pat. No. 3,430,521 to M. L. Kulman and U.S. Pat. No. 3,610,343 to S. A. Bratt.

U.S. Pat. Nos. 3,739,659 and 3,960,035 assigned to the assignee of the present invention represent further improvements in speed shifting mechanisms for power tools. The inventions disclosed in the two last mentioned patents include pressure fluid actuators for holding a torque responsive clutch disengaged to effect speed shifting. Such mechanisms are particularly advantageous for use in pneumatic multiple tools arrangements wherein it may be desired to effect the shifting of all tools simultaneously. However, for single tool installations the pressure fluid actuated shifting mechanisms is usually more expensive and requires careful maintenance, and, of course, pressure fluid actuated speed shift mechanisms cannot be used conveniently with electric motor driven tools or the like where a source of pressure fluid is normally not available.

SUMMARY OF THE INVENTION

The present invention provides for an improved automatic speed shifting device for a power tool in which a torque responsive clutch operates to become disengaged to effect a change in the rotary output speed of a planetary gear set, and a torque responsive coupling becomes effective upon initial disengagement of the clutch to hold the clutch disengaged. With the speed shift device of the present invention a torque responsive clutch is rapidly and positively disengaged to effect a speed change in the tool output spindle and accidental reengagement of the clutch under load is substantially prevented as long as sufficient torque is imposed on the planetary gear set.

The present invention further provides for an imposed speed shift device for a power tool wherein a torque responsive clutch is held disengaged by a torque responsive nondisengaging coupling operating in combination with a one-way clutch connected to the ring gear of a planetary gear set. Accordingly, the present invention provides a speed shift device for a power tool which operates to change from a relatively high speed to a low speed without imparting severe shock loads on the tool drive members and without causing rapid engagement of members rotating at considerably different speeds. Furthermore, the speed shift mechanism of the present invention does not require pressure fluid actuating means or means for momentarily deenergization of the drive motor in order to provide a smooth shifting from one speed to the other.

DESCRIPTION OF THE PREFERRED EMBODIMENT

Figure 1:
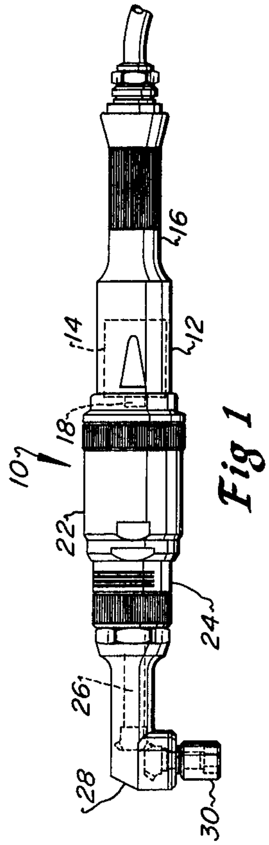
FIG. 1 is a longitudinal side view of a portable power tool which includes the speed shift mechanism of the present invention.

The speed shift mechanism of the present invention is particularly adapted for use in a portable power tool such as the tool shown in FIG. 1 and generally designated by the numeral 10. The tool 10 is of a type generally well known for use in tightening threaded fasteners. The tool 10 is characterized by a housing portion 12 which houses a motor 14 and includes an integral handle 16. The motor 14 may be pneumatic or electric and includes a rotor 18. The tool 10 also includes a housing portion which is made up of a plurality of separate pieces 20, 22, and 24 which contain the speed shifting mechanism of the present invention. The tool 10 further includes a drive spindle 26 which is disposed in an angle drive housing 28 and which is drivably connected to a nut driving socket member 30.

Figure 2:
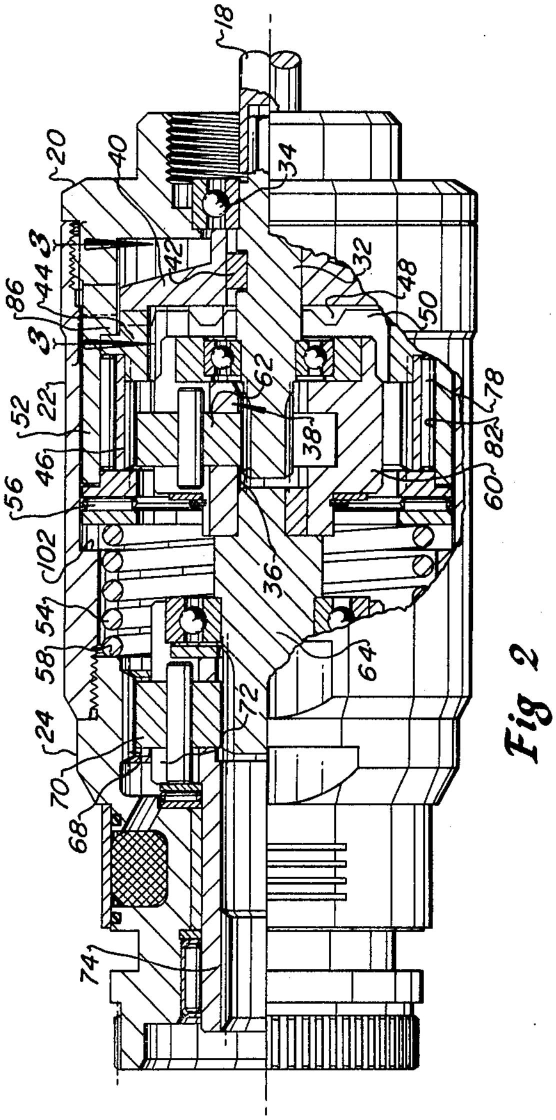
FIG. 2 is a longitudinal section view of the speed shift mechanism of the present invention.

Referring to FIG. 2 the rotor member 18 is drivably engaged to one end of a rotatable spindle 32 which is rotatably mounted in a bearing 34. The end of the spindle 32 opposite the end connected to the rotor member 18 is formed as the sun gear 36 of a planetary gear set generally designated by the numeral 38. The spindle 32 is also connected to a driving member 40 of a torque responsive clutch by a suitable interfitting key 42. The clutch member 40 is engaged with a driven clutch member 44 as shown in FIG. 2. The driven clutch member 44 is suitably fixed to a ring gear 46 of the planetary gear set 38 such as by a interference fit between the respective members. Alternatively, the clutch member 44 and the ring gear 46 could be formed as an integral member.

Figure 5:
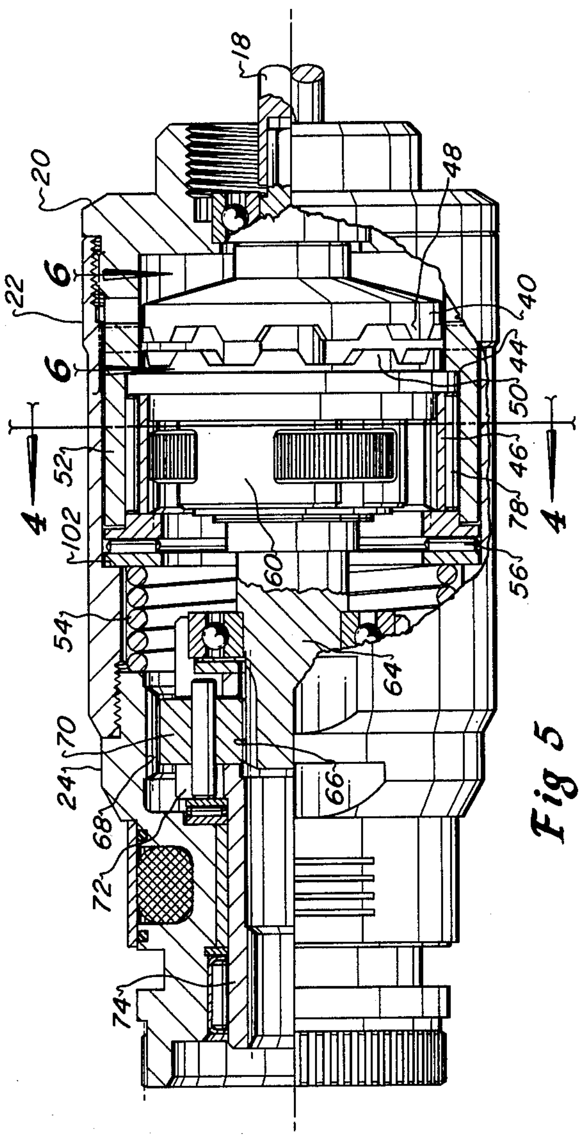
FIG. 5 is a view similar to FIG. 1 showing the torque responsive clutch of the speed shift mechanism disengaged; and, FIG. 6 is a fragmentary view similar to FIG. 3 and taken from the line 6—6 of FIG. 5.

The torque responsive clutch is of a type generally well known in which, as shown in FIG. 5, the driving and driven members 40 and 44 include respective axially projecting teeth 48 and 50 which are interengaged along respective sloping side surfaces. The interengaging teeth 48 and 50 comprise means responsive to the transmission of torque from the driving to the driven member for producing a force tending to axially separate the two clutch members. In the embodiment shown the driven member 44, together with the ring gear 46 and a sleeve 52, moves axially to disengage from the driving member 40. A coil spring 54 disposed in the housing portion 22 and engaged with a thrust bearing 56 biases the ring gear 46 and the driven member 44 into engagement with the driving member 40. The force exerted by the spring 54 determines the torque value required to cause relative axial movement between the clutch members. The spring force may be adjusted, for example, by placing shims between the end of the spring 54 and a transverse wall 58 of the housing portion 24, or by other suitable spring adjusting means.

Figure 4:
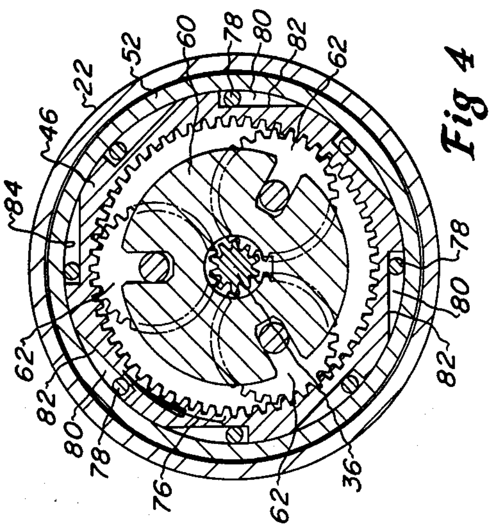
FIG. 4 is a transverse section view taken along the line 4—4 of FIG. 5.

Referring to FIG. 4 also, the planetary gear set 38 includes a planet gear carrier 60 on which are rotatably mounted planet gears 62 engaged with the ring gear 46 and the sun gear 36. The planet gear carrier 60 is drivably connected to a spindle 64 which includes an integral sun gear 66 for a second planetary gear set including a ring gear 68 and planet gears 70, one shown in FIGS. 2 and 5. The planet gears 70 are rotatably mounted on a carrier 72 which includes a rotatable output spindle 74 adapted to be drivably connected to the final drive spindle 26. The spindle 64 could be adapted to be connected somewhat more directly to the final drive spindle 26 if the further speed reduction provided by the second planetary gear set was not desired.

The ring gear 46 is mounted within the sleeve 52 for rotation in the direction indicated by the arrow 76 in FIG. 4. The ring gear 46 is connected to the sleeve 52 by way of a one-way clutch comprising a plurality or rollers 78 disposed in recesses 80 formed on the outer circumference of the ring gear. The recesses 80 include sloping surfaces 82 which provide for wedging the rollers 78 between said surfaces and the inner wall surface 84 of the sleeve 52 whereby the ring gear is prevented from the rotating with respect to the sleeve in the direction opposite to that of the arrow 46.

Figure 3:
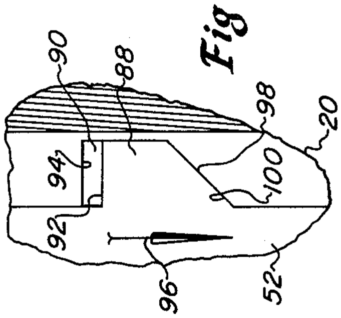
FIG. 3 is a fragmentary view of the interfitting teeth of the torque responsive coupling taken from the line 3—3 of FIG. 2.

Referring to FIGS. 2 and 3 the sleeve 52 is further characterized by a shoulder 86 which is engageable with the driven clutch member 44. The sleeve 52 also includes means comprising a torque responsive coupling characterized by at least one axial projection 88 which is disposed in a complementary recess 90, formed in the housing portion 20. The projection 88 includes a side surface 92 substantially parallel to the longitudinal axis of the sleeve 52 which is engageable with a cooperable surface 94 to prevent rotation of the sleeve in a direction opposite to that of the arrow 96 in FIG. 3. The projection 90 also includes an axially sloping surface 98 engageable with a surface 100 whereby when the sleeve 52 tries to rotate in the direction of the arrow 96 in FIG. 3 it is moved axially away from the housing portion 20. The sleeve 52 includes more than one projection 88, preferably at least three spaced apart equidistant around the circumference of the sleeve. Accordingly, the housing portion 20 includes complementary recesses 90 for each projection albeit only one projection and one recess are shown in the drawing views presented herewith.

When the speed shift mechanism is at rest or when the resistance to rotation of the spindle 32 is relatively low the torque responsive clutch is engaged under the bias of the spring 54 which urges the thrust bearing 56 together with the ring gear 46 and the driven clutch member 44, as well as the sleeve 52, into the positions shown in FIGS. 2 and 3. Accordingly, the ring gear 46, planet gear carrier 60, and the spindle 64 are rotated at the speed of the spindle 32 assuming of course, that rotation is in the direction of the arrow 76, FIG. 4. Therefore, in operation in the tool 10, for example, the speed shift mechanism provides for relatively high speed turning of the final drive spindle as long as the resistance to turning or torque transmitted by the clutch members 40 and 44 does not result in their disengagement.

When the resistance to turning of the final drive spindle 26 increases to a predetermined torque transmitted by the torque responsive clutch, the driven member 44 and the ring gear 46 are urged to move axially away from the driving member 40 due to the reaction forces on the interfitting teeth 48 and 50. At the instant of disengagement of the clutch member 44 from the driving clutch member 40 the sun gear 36 will rotate the planet gears 62 with respect to the ring gear 46 which will cause a reaction force tending to rotate the ring gear in the direction opposite to that of the arrow 76 in FIG. 4. The one-way clutch will prevent the ring gear 46 from rotating in the direction opposite to that of the arrow 76 and the turning moment or torque exerted on the sleeve 52 and will tend to rotate the sleeve with the ring gear. However, such rotation of the sleeve is substantially prevented by the projections 88. The torque exerted on the sleeve 52 by the ring gear 46 through the one-way clutch will cause the sleeve to move axially to the position shown in FIGS. 5 and 6. Axial movement of the sleeve 52 together with the ring gear 46 and driven clutch member 44 is limited by a stop comprising the transverse face 102 in the housing portion 22 which prevents the projection 88 from leaving the recess 90, as shown in FIG. 6.

Figure 6:
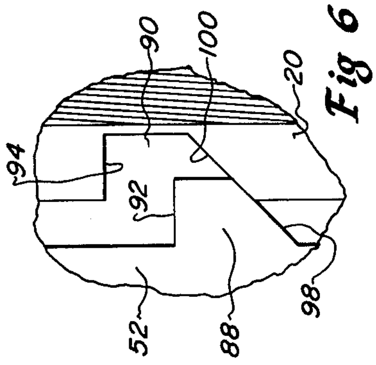

As long as the torque transmitted by the speed shift mechanism is sufficient to hold the mechanism in the condition shown in FIGS. 5 and 6 the clutch member 44 will be fully disengaged with no danger of the interfitting teeth 48 and 50 clashing or becoming momentarily reengaged. With the clutch member 44 disengaged the planetary gear set 38 becomes operative to drive the planet carrier 60 and the spindle 64 at a reduced speed with respect to the spindle 32 with a concomitant increase in torque applied to the spindle 64 and the final drive mechanism. The sleeve 52 may or may not move axially with the initial movement of the ring gear 46 but once sufficient torque is exerted on the sleeve by the one-way clutch the ring gear and the clutch member 44 will be moved along with the sleeve to the positions shown in FIGS. 5 and 6.

When the tool operating cycle is complete and the motor is shut off, or driving torque on the spindle 32 is otherwise reduced, the force of the spring 54 will reposition the sleeve 52 and ring gear 46 to the position shown in FIGS. 2 and 3 and cause reengagement of the clutch member 44 with clutch member 40.

As may be appreciated by the foregoing description the speed shift mechanism of the present invention is operable to effect a smooth and positive speed reduction of the spindle 64 with the respect to the spindle 32. Moreover, only as long as sufficient torque is exerted on the mechanism does the torque responsive clutch remain disengaged. Accordingly, the speed shifting operation in both directions is dependent only on the drive motor torque output condition and is not subject to any signalling errors from a pressure fluid source, for example.

What is claimed is:

1. In a power tool for tightening threaded fasteners and the like:

a housing;

a drive motor disposed in said housing;

a driving spindle drivably connected to said motor;

a driven spindle;

a speed shift mechanism disposed in said housing interconnecting said driving and driven spindles and operable to reduce the rotational speed of said driven spindle with respect to said driving spindle, said mechanism including a planetary gear set comprising a sun gear drivably connected to said driving spindle, and meshed with one or more planet gears, a carrier for said planet gears drivably connected to said driven spindle, and a ring gear meshed with said planet gears and disposed for rotation in at least one direction in said housing;

a torque responsive disengaging clutch including driving and driven clutch members interconnecting said planetary gear set and said driving spindle in such a way that said driven spindle is rotated at the speed of said driving spindle when said clutch members are engaged, and in response to a predetermined torque said driving and driven clutch member become disengaged to effect a reduced speed of said driven spindle with respect to said driving spindle; and, a torque responsive coupling operable in response to the disengagement of said clutch to hold said clutch disengaged as long as a predetermined torque is being transmitted to said driven spindle by said planetary gear set.

2. The invention set forth in claim 1 wherein:

said driving and driven clutch members include cooperable interfitting teeth responsive to a predetermined torque being transmitted by said clutch to cause one of said members to move with respect to the other of said members to effect disengagement of said clutch.

3. The invention set forth in claim 2 wherein:

said speed shift mechanism includes one-way clutch means engaged with said ring gear to permit rotation of said ring gear in one direction with said driving spindle when said clutch is engaged and to substantially prevent rotation of said ring gear in the opposite direction when said clutch is disengaged.

4. The invention set forth in claim 3 wherein:

said one-way clutch means includes a sleeve disposed in said housing and connected to said torque responsive coupling whereby in response to a torque imposed on said sleeve by said ring gear said torque responsive coupling becomes operable to hold said clutch disengaged.

5. The invention set forth in claim 4 wherein:

said torque responsive coupling includes projection means formed on said sleeve and having sloping surface portions engaged with cooperable surface portions fixed to said housing whereby in response to a predetermined torque exerted on said sleeve by said ring gear said surface portions interact to cause said sleeve to hold said clutch disengaged.

6. The invention set forth in claim 5 wherein:

said driven clutch member is movable with respect to said driving clutch member to effect disengagement of said clutch and said sleeve includes means engageable with said driven cluch member to hold said driven clutch member disengaged from said driving clutch member.

7. The invention set forth in claim 6:

said sleeve is responsive to torque imposed thereon by said ring gear to move said driven clutch member away from said driving clutch member.

8. The invention set forth in claim 6 wherein:

said driven clutch member is fixed to said ring gear for rotatably driving said driving said ring gear and said carrier at the speed of said driving spindle when said clutch is engaged and for moving said ring gear and said sleeve axially when said clutch becomes disengaged.

9. The invention set forth in claim 8 wherein:

said speed shift mechanism includes means disposed in said housing for biasing said driven clutch member into engagement with said driving clutch member.

10. The invention set forth in claim 9 wherein:

said means for biasing said driven clutch member comprises a spring disposed in said housing and engaged with a thrust bearing, and said thrust bearing is engaged with said ring gear for biasing said ring gear and said driven clutch member into a position whereby said clutch is engaged.

* * * * *

UNITED STATES PATENT AND TRADEMARK OFFICE

CERTIFICATE OF CORRECTION

PATENT NO. : 4,215,594

DATED : August 5, 1980

INVENTOR(S) : William Workman, Jr. and John R. Bos

It is certified that error appears in the above-identified patent and that said Letters Patent are hereby corrected as shown below:

Column 6, line 25, delete "said" (first occurrence).

Column 6, line 25, delete "driving" (second occurrence).

Signed and Sealed this

*Twenty-eighth* Day of *October 1980*

[SEAL]

*Attest:*

SIDNEY A. DIAMOND

*Attesting Officer* *Commissioner of Patents and Trademarks*